Oct. 24, 1944. L. R. SIMMONS 2,360,902
VEHICLE
Filed Feb. 3, 1942   6 Sheets-Sheet 1

Inventor
Lovel R. Simmons
By Harold M Knoth
Atty.

Oct. 24, 1944. L. R. SIMMONS 2,360,902
VEHICLE
Filed Feb. 3, 1942 6 Sheets-Sheet 2
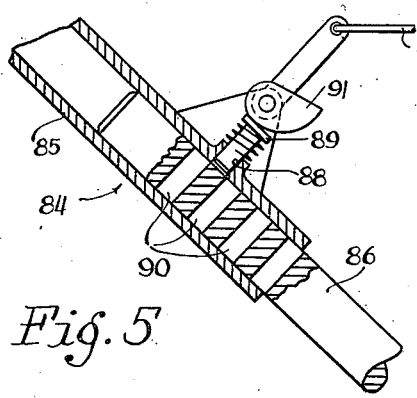
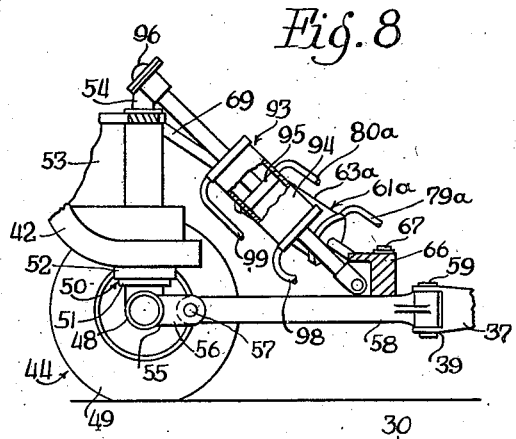
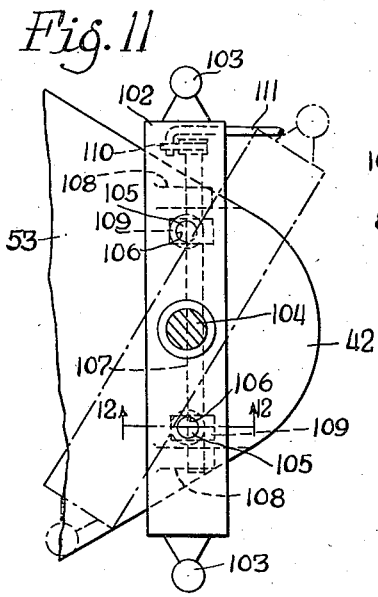
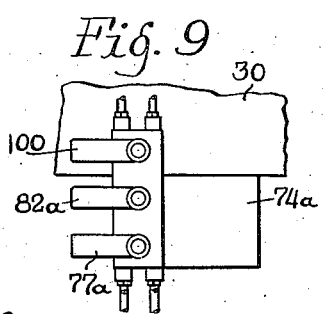
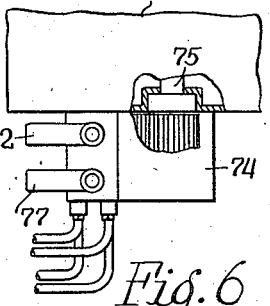
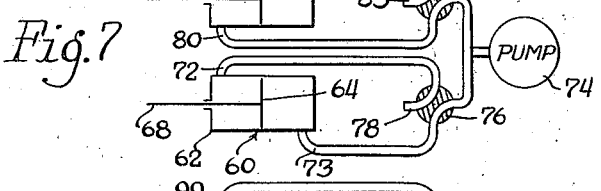
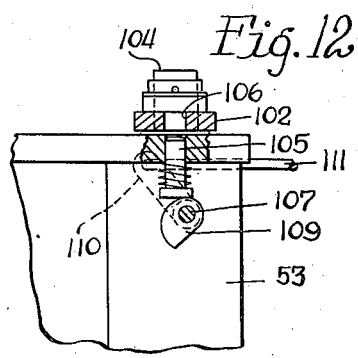
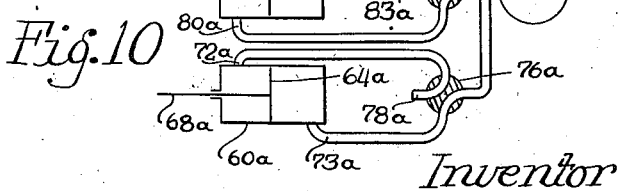
Inventor
Lovel R. Simmons
By Harold M. Knoth Atty.

Inventor
Lovel R. Simmons
By Harold M. Knoth
Atty.

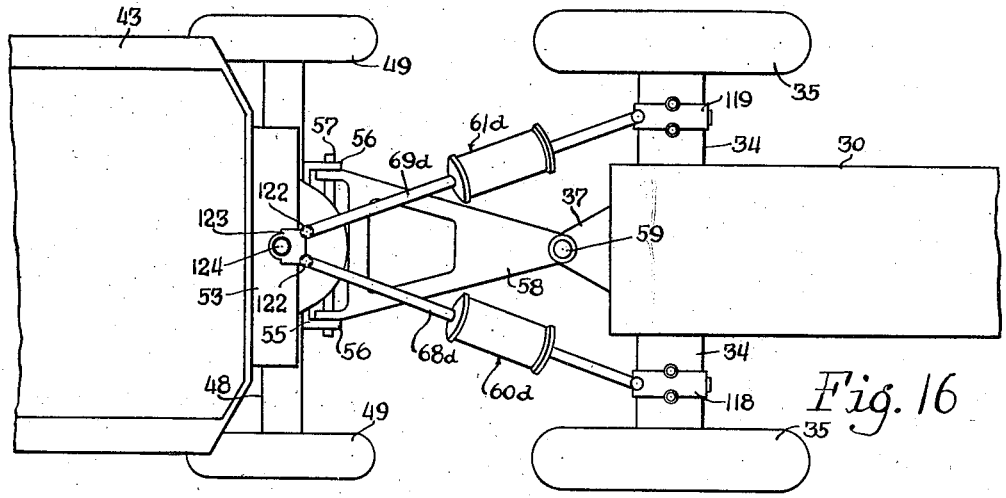
Fig. 16
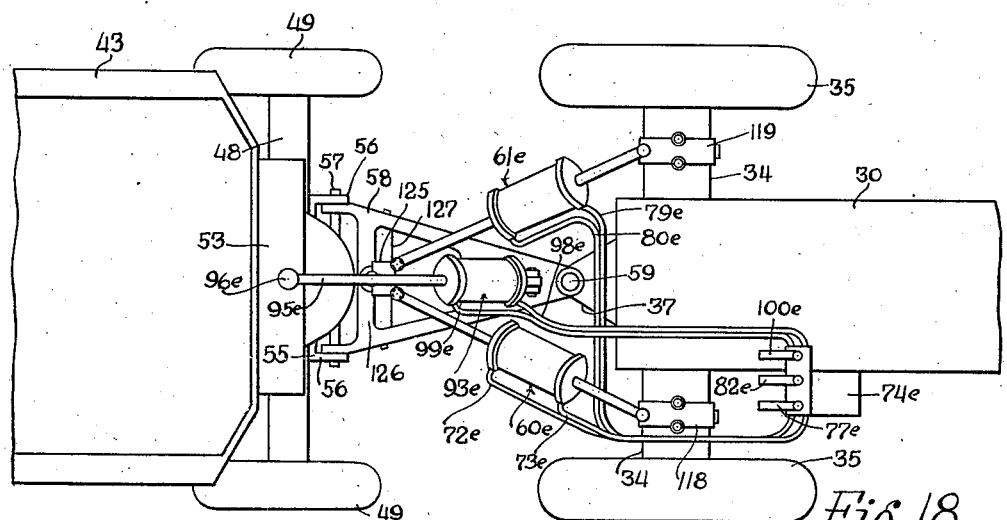
Fig. 18
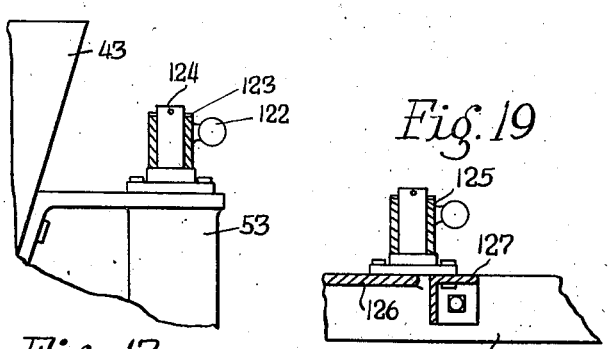
Fig. 19
Fig. 17
Inventor
Lovel R. Simmons
By Harold M. Knoth
Atty.

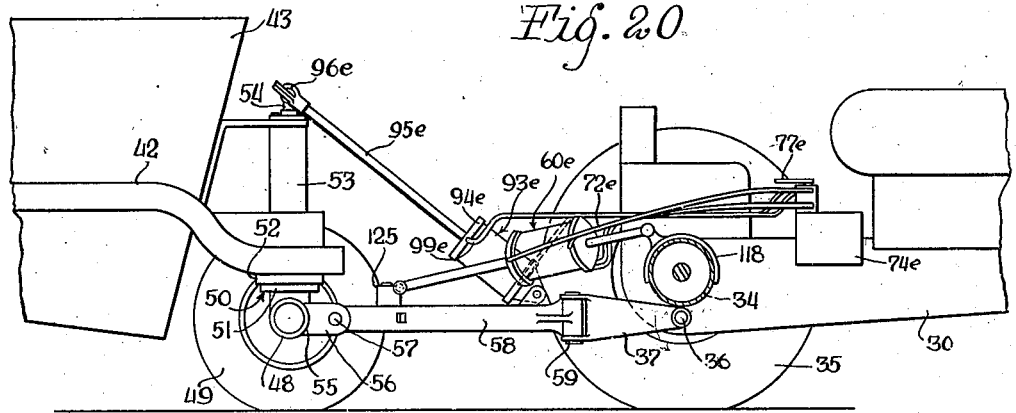
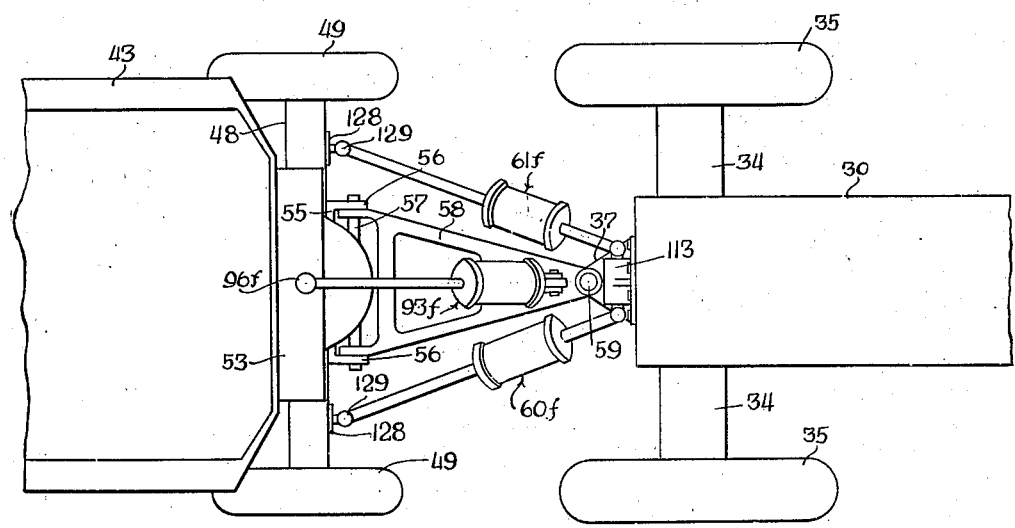
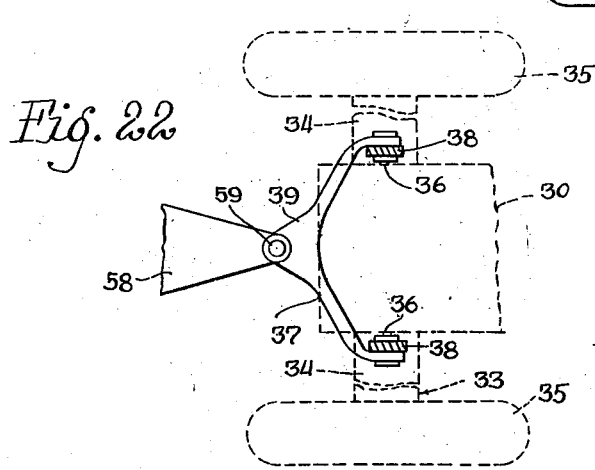

Oct. 24, 1944. L. R. SIMMONS 2,360,902
VEHICLE
Filed Feb. 3, 1942 6 Sheets-Sheet 6
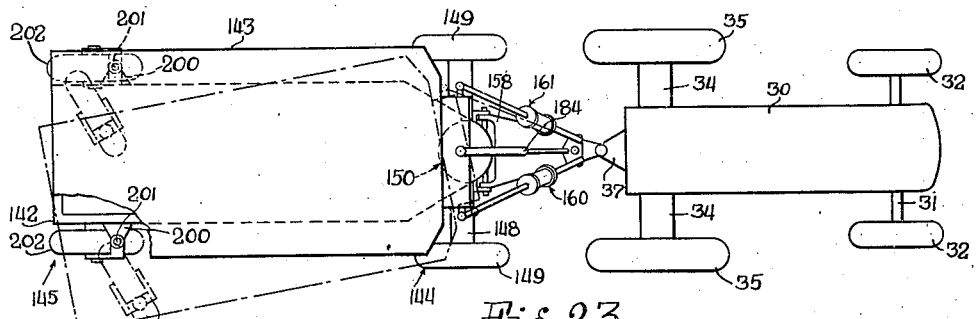
Fig. 23
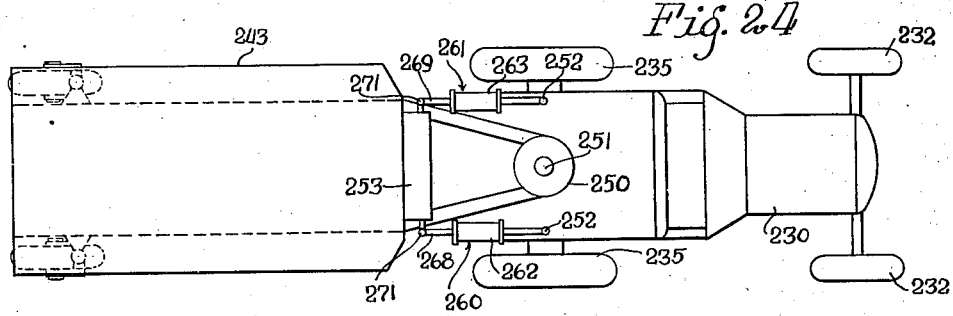
Fig. 24
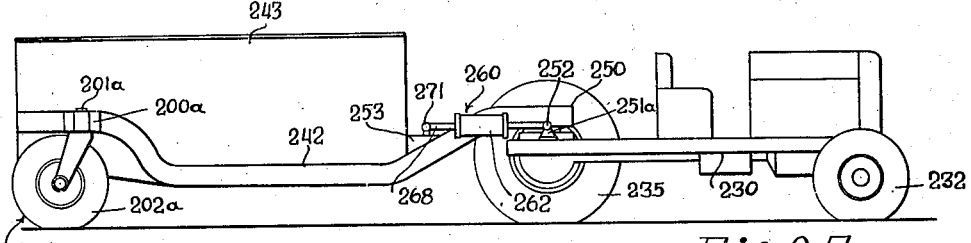
Fig. 25
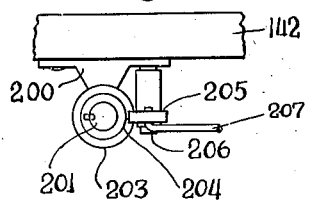
Fig. 27
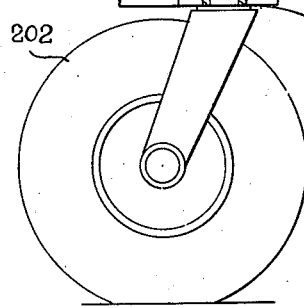
Fig. 26
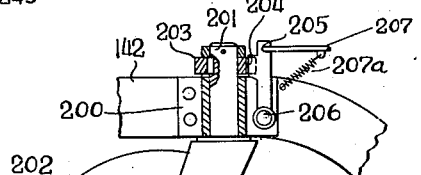
Inventor
Lovel R. Simmons
By Harold M Knoth
Atty.

Patented Oct. 24, 1944

2,360,902

UNITED STATES PATENT OFFICE 2,360,902

VEHICLE

Lovel R. Simmons, Jackson, Miss.

Application February 3, 1942, Serial No. 429,396

39 Claims. (Cl. 280—33.5)

GENERAL STATEMENT OF THE INVENTION

The present invention pertains to vehicles and more particularly to vehicular units of the type comprising interconnected vehicles, one of which serves as a source of draft or propelling power, and the other of which consists in a load-carrying or similar work-performing vehicle. Still more particularly, the invention relates to improvements in the steerability, maneuverability, and tractionability of such vehicles. In certain aspects, the invention contemplates improvements in vehicular units of the type set forth in my copending applications, Serial No. 327,446, filed April 2, 1940, now abandoned, and Serial No. 328,917, filed April 10, 1940, now Patent No. 2,266,913, dated December 23, 1941.

One type of vehicular unit in which the present invention provides improvements consists of a tractor and trailer, articulately interconnected by draft means for travel together, changes in the direction of travel of the trailer being controlled by the tractor by the exerting of pulling or pushing forces through the draft means. The trailer may be either a full-trailer, carried normally independently of the tractor, or a semi-trailer, supported at one end on the tractor. For most purposes, the characteristics of both trailers are similar; but, because of the nature of the differences in the manners in which the trailers are supported on or connected to the tractor, certain problems are presented in the use of the full-trailer, for example, that are not presented, or are presented in lesser degree, in the use of the semi-trailer. The converse is likewise true. It will be understood, of course, that certain of these characteristics and problems are also common to other vehicular units, such as may consist of graders, scrapers, excavators and the like, that may be drawn or otherwise propelled by tractors or similar power vehicles. For the purposes of exposition and general discussion, however, the tractor and trailer may be chosen as representing the aspects of the invention under consideration.

Such tractor and trailer unit is admirably adapted for use in hauling or other work on building, excavating, road grading, and like programs, and it is in these instances that there are presented conditions and circumstances most adverse to efficient operation of ordinary units. These conditions result mainly from variations in ground or road surfaces or other limitations on traction or maneuverability. In the case of the semi-trailer unit, the ability of the tractor to obtain traction is increased because the tractor carries part of the weight of the trailer. Also, maneuverability is not excessively difficult, because of the comparatively simple, single pivotal connection between the tractor and trailer. However, since the tractor must carry the superimposed weight of the trailer at all times, it must be specially constructed to withstand heavy loads. Moreover, there are important limitations on the size of the trailer. Further, since changes in the direction of travel of the trailer are dependent upon movement of the tractor, maneuvering may be limited by circumstances, such as narrow roads or other closely confined areas, that impose restrictions on the degree to which the tractor may be moved. Hence, it is desirable that means be provided for maneuvering the trailer separately from the forces of movement normally imparted by the tractor through the draft or supporting connection.

Certain advantages in operation and construction dictate the use of full-trailers in lieu of semi-trailers. Since in this case the tractor does not normally carry any part of the weight of the trailer, it is desirable that means be provided for temporarily transferring to or superimposing part of the weight of the trailer on the tractor, thus increasing the ability of the tractor to obtain traction. Such means may take the form of a device which imparts pressure from the trailer downwardly on the tractor. Representative devices are set forth in my copending applications referred to above. Further, the draft or propelling connection between the tractor and the full-trailer usually consists of a double pivotal connection, one on the tractor and another on the trailer (the latter may include the steering pivot for the trailer front wheels). Because of this connection, maneuvering of the trailer, particularly in backing, often becomes quite difficult. Hence, it is desirable, as in the case of a semi-trailer unit, to provide means for changing the position of the trailer separately from forces exerted by the tractor through the draft connection. It is further desirable to combine, under certain circumstances, the functions of the last-mentioned means with the functions of the weight-transferring or pressure means.

STATEMENT OF THE OBJECTS OF THE INVENTION

The following objects, among other objects of greater or lesser importance that will appear to those skilled in the art, are sought to be attained by the present invention.

The principal object of the invention is to provide an improved unit of the type specified above in which maneuverability is increased.

An important object is to provide means for applying force to one of a pair of interconnected vehicles for shifting the vehicles relatively. More specifically, it is an object of the invention to shift the vehicles laterally with respect to each other, or to vary the relative angular positions of the vehicles for the purpose of changing the direction of travel of at least one of the vehicles.

Another important object of the invention is the provision of improved means for increasing the traction of the power or draft vehicle, by means of a temporary transfer of at least part of the weight of the other vehicle to said power or draft vehicle.

Another important object is to provide means combining the functions of the traction-increasing means and the vehicle-shifting means.

It is an object of the invention to connect the aforesaid means between the vehicles, either directly or indirectly, so that one vehicle serves as a support or medium through which force may be applied to the other vehicle.

The invention seeks as another object the provision of an improved vehicle unit construction in which one vehicle may be shifted with respect to its ground supports, and particularly by means of force-exerting means directly or indirectly connected to one of the vehicles or between the vehicles.

Still another object is to provide operating means for the control of the force-exerting means, whereby the force-exerting means, if plural, may be controlled individually or in conjunction with each other to accomplish varied relative movements between the vehicles.

Still another object is the provision in interconnected vehicles of a support which carries one vehicle and with respect to which that vehicle may be shifted laterally.

Still another object is the provision of an improved vehicular unit including a castering ground-engaging means on one vehicle permitting free lateral movement of said vehicle with respect to the other.

And still another object is to provide force-exerting means in the form of two-way, movable expanding and contracting means capable of providing means efficient and flexible in operation.

And still another object is to provide such means in the form of two-way fluid-pressure devices.

A still further object is to provide means for achieving the foregoing and other objects in a vehicular unit of either the semi- or full-trailer types, including all such units, whether the trailing vehicle is partially supported by the draft or power vehicle or whether the trailing vehicle is independently supported.

A complete understanding of the foregoing and other objects and important features of the invention may be had from the following detailed description taken in conjunction with the accompanying sheets of drawings, wherein are disclosed preferred and modified forms of vehicle units constructed according to the principles of the invention.

DESCRIPTION OF THE FIGURES IN THE DRAWINGS

Figure 5 is an enlarged sectional view of one type of locking means between the vehicles;

Figure 6 is a view, partly in section, of a type of fluid pump and control means for the power devices connected between the vehicles;

Figure 7 is a schematic view of one form of fluid pressure system that may be used with a two-cylinder force-exerting means;

Figure 8 is a partial view of the front of one vehicle and a part of the rear of the other vehicle, showing the use of a third pressure device;

Figure 9 is a view of one form of pump and control means for a system that employs three pressure devices;

Figure 10 is a schematic view of a fluid pressure system that may be employed with three pressure devices;

Figure 11 is a view of a modified form of vehicle structure in which lockable and releasable means may be used to support the pressure devices;

Figure 12 is a sectional view taken substantially along the line 12—12 of Figure 11;

Figure 16 is a plan view of proximate ends of two vehicles, showing a modified form of arrangement in which the pressure devices converge toward the trailer;

Figure 18 is a similar plan view, illustrating a modified system in which three pressure devices are used;

Figures 17 and 19 are, respectively, views of a connecting member as mounted on one vehicle directly and as mounted on one vehicle indirectly through a draft tongue;

Figure 20 is a side elevational view of the arrangement shown in Figure 17;

Figure 21 is a plan view of a modified form of the arrangement shown in Figures 17 and 20;

Figure 22 is a fragmentary view, with the tractor in broken lines, of one form of draft tongue or hitch connection;

Figure 23 is a plan view of a modified form of vehicular unit in which one vehicle has castering ground wheels, the view further illustrating in broken lines a different laterally angled relationship between the vehicles;

Figure 24 is a plan view of a vehicular unit in which the trailing vehicle is of the semi-trailer type;

Figure 25 is a side elevational view of the unit shown in Figure 24;

Figure 26 is an enlarged fragmentary view, partly in section, of a caster wheel, showing means for locking the wheel against castering; and, Figure 27 is a fragmentary plan view of the locking means shown in Figure 26.

GENERAL DESCRIPTION

Figure 1:
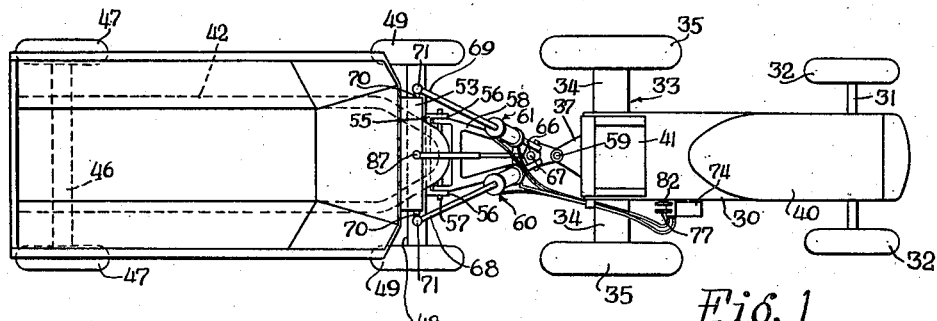
Figure 1 is a plan view of one type of articulately connected vehicular unit embodying one form of the invention.

As shown in the drawings, a pair of vehicles are articulately interconnected, in some cases for relative movement laterally, in some cases for relative movement vertically, and in certain cases for relative movement in both directions, all of which will hereinafter appear in greater detail. One of the vehicles is a propelling or draft vehicle, hereinafter referred to as a tractor, which operates to move or propel the other vehicle, hereinafter termed a trailer. The means by which the tractor exerts a motive force for travel of the vehicles appears in different forms in the several figures of the drawings, and, for the sake of convenience, in the case of a four-wheeled trailer, will be described below as a draft member or tongue; in the case of a semi-trailer vehicle, the connecting means will be termed or will include a pivot or supporting structure, inasmuch as such structure serves, in addition to connecting the vehicles, as means for supporting the front end of the semi-trailer on the rear of the tractor. As will also appear below, certain parts of each or several of the modified forms of the invention may be interchanged with or substituted for each other in an obvious manner. Appropriate designations of certain of these parts will be made and the relationship between other parts will readily appear to those versed in the art.

*Figures 1 to 7 and 22*

The tractor in the vehicular unit here disclosed may be of any suitable type and is here shown as including a main frame or body 30 carried at its front end on a transverse front axle structure 31 having ground wheels 32, and carried at its rear end on a rear axle structure 33 having transverse axle housings 34 extending at opposite sides of the body 30 and a pair of transversely spaced, rear traction or drive wheels 35. As best shown in Figure 22, the rear part of the body, at the axle structure 33, pivotally carries, on transverse pivot means in the form of pins 36, a hitch or connecting member 37, the tractor including suitable supporting ears or lugs 38 for the purpose. The hitch member is preferably in the form of a V and the apex thereof is formed with a vertical bearing or journal portion 39 providing for a pivot on a vertical axis. The hitch member may, for most purposes, be considered a part of the tractor. The tractor may include the usual forward radiator and hood structure 40 and an operator's seat 41.

The trailing vehicle, or trailer, shown here is of the full or four-wheel type and has a main frame 42 and a body 43 carried on front and rear ground support structures 44 and 45, respectively. The rear structure, in this instance, consists of a transverse rear axle 46 having ground-engaging means, such as transversely spaced wheels 47. It will be understood, of course, that any form of wheel structure may be employed.

The front structure is provided with a transverse axle member 48 carrying at opposite ends thereof ground-engaging means in the form of wheels 49. The axle is connected by means permitting the wheeled axle to swing or to have lateral movement angularly with respect to the trailer frame. Such means is designated here at 50 and includes a swivel member 51, carried by the axle 48, and a second swivel member 52, carried by the trailer frame 42, the two members forming a fifth-wheel or turntable means by virtue of which the trailer frame and front ground support structure may have relative movement about a vertical axis. It will be obvious that this front structure may be provided at the rear of the trailer, if desired.

The forward part of the trailer further carries a supporting bracket or structure 53, here rigidly secured to the trailer frame 42 and body 43. This bracket extends vertically upwardly and carries at its top a central connecting member 54, the purpose of which will be described below. The front axle 48 carries rigidly thereon a hitch or connecting member 55 having forwardly extending, transversely spaced, apertured ears 56 which are connected by a transverse pivot means in the form of a rod or shaft 57 to rear legs of a draft tongue or member 58. The forward end of the tongue is connected to the hitch member 37 on the tractor by means including a vertical pivot pin 59. Thus there is provided means for articulately connecting the tractor and trailer for travel together. The forward portion of the tongue 58 may, along with the member 37, be spoken of as part of the tractor, and the rearward part of the tongue, as part of the trailer. During normal operation of the vehicles, the tongue can swing laterally with respect to the tractor about the pivot pin 59 and laterally with respect to the trailer about the vertical pivot or steering axis provided by the swivel or turntable structure 50, thus steering the front ground support 44 of the trailer as the vehicles change direction. The tongue is also movable vertically with respect to the tractor and trailer about the pivots 36 and 57, respectively.

During operation of the tractor-trailer unit, and especially during backing thereof as explained previously, the angular relationship between the vehicles may inadvertently become changed, or it may be desired to vary such angular relationship for certain purposes, although conditions may be such that there is insufficient area within which to maneuver the tractor to accomplish required changes. According to the present invention, and the form now described, there is provided means for shifting the vehicles laterally with respect to each other by the exerting of force between the vehicles separate from the force exerted by one vehicle against the other through the draft means. One form of such force-exerting means is illustrated in Figures 1 to 4 as comprising a pair of expansible and contractible means preferably in the form of right- and left-hand pressure devices 60 and 61, which may include, as shown, two-way fluid-pressure cylinders 62 and 63, respectively, and pistons 64 and 65. In order that the devices 60 and 61 may be connected to the tractor, there is provided a supporting block 66 to which the cylinders 62 and 63 are connected, preferably pivotally. This block is preferably pivoted by a pin 67 to the upper side of the forward end of the tongue 58, and, by that medium and through the member 37, the devices are secured ultimately to the tractor body 30. The pistons 64 and 65 carry piston rods 68 and 69, respectively, which diverge upwardly and rearwardly toward opposite ends of the support 53 at the front of the trailer. This support carries a pair of transversely spaced connecting members 70, which are connected respectively, preferably by ball and socket joints 71, to the piston rods 68 and 69.

Figure 2:
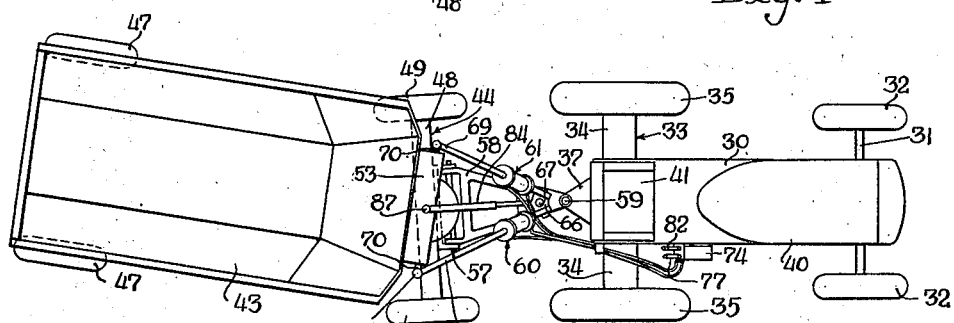
Figure 2 is a similar view, showing a different laterally angled relationship between the vehicles.
Figure 3:
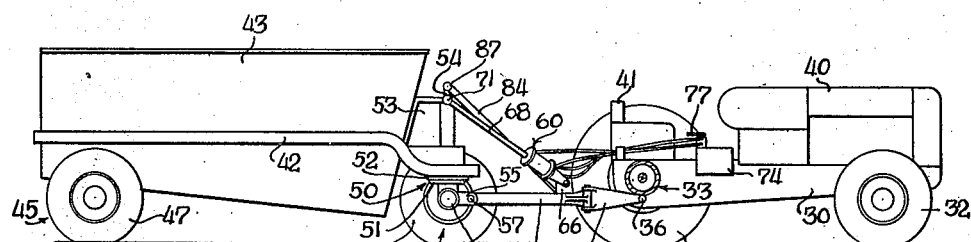
Figure 3 is a side elevational view of the vehicles shown in Figure 1.

As best shown in Figure 7, the cylinders 62 and 63 are of the two-way type. The cylinder 62 includes at opposite ends thereof fluid inlets 72 and 73 (which serve also as outlets) connected by suitable fluid conduits to a fluid pump 74. The pump may, as shown in Figure 6, be of the gear type, driven in any suitable manner from a power shaft, as at 75, of the tractor. A two-way valve 76 is selectively connectable between the pump 74 and either inlet 72 or 73 of the cylinder 62, the valve being controllable in any manner, as by a lever 77. When the pump is connected to one inlet 72 or 73, the other inlet is connected by a port in the valve 76 to a return line 78 to the pump reservoir, all of which may be conventional. The cylinder 63 is similarly provided with inlets 79 and 80 controllable by a valve 81 and operating lever 82. A return line for the returning fluid of this cylinder is indicated at 83. The cylinders may be separately operated to apply force along lines of force offset from or divergent to the line of force exerted between the vehicles through the tongue 58. When one cylinder is contracted, the other may be expanded, either may be operated separately, or any other desired manner of operation may be indulged. As shown in Figure 2, the left-hand device 61 may be expanded to move the front end of the trailer to the left, or to a position more nearly in longitudinal alignment with the tractor. The right-hand device 60 may be simultaneously contracted to facilitate this movement. It should be noted that, during this movement, the trailer pivots laterally generally about the rear wheels 47, the front of the trailer and the front ground support structure having relative lateral movement about the axis of the swivel or fifth-wheel means. Meanwhile, the tractor may be backed or moved forwardly within whatever area is available and various maneuvering effected by the combining of the functions of the cylinders and the movement of the tractor.

Figure 4:
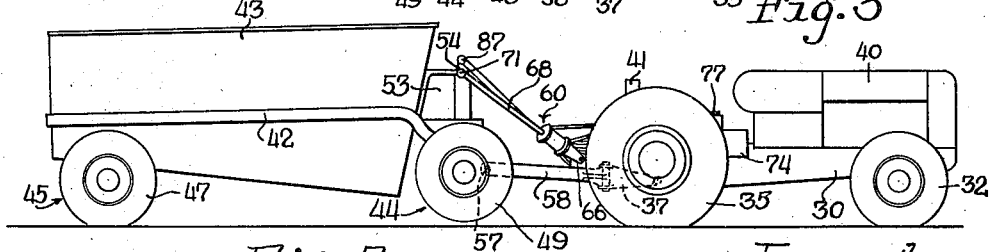
Figure 4 is a view similar to Figure 3 and showing a different vertically angled relationship between the vehicles.

As shown in Figure 4, the devices 60 and 61 may be expanded simultaneously to exert a lifting force between the rear of the tractor and the front of the trailer, thus raising the front end of the trailer slightly. This movement relieves the front wheels 49 of the trailer of some of the trailer weight, this weight being transferred to the rear end of the tractor. In this manner, there is additional weight or pressure thrust on the tractor, by virtue of which the tractor has an increased ability to obtain traction. Since circumstances may require that the trailer be maintained in raised position so that maneuvering of the vehicles will be facilitated, and, since it may be difficult to maintain this raised position during independent operation of the devices 60 and 61, there is provided a locking means 84 for locking the trailer against downward movement with respect to the tractor. As best shown in Figures 1 and 5, this means consists of a pair of telescopic members 85 and 86, the first of which is connected, preferably by a ball and socket joint 87, to the member 54 on the trailer front structure 53, and the other of which is pivotally connected to the supporting block 66 on the draft tongue 58. The member 86 is formed with a single opening 88 in which is slidably carried a spring-pressed plunger 89. The member 85 has a plurality of bores 90, any one of which may be alined with the plunger 89. A suitable means, such as a lever-operated cam means 91, may be provided for moving the plunger 89 into a selected bore 90. The lever may be operated by the tractor operator by means of a link or cable, as indicated at 92 in Figure 5. It will be understood that any suitable lock may be provided for the purpose stated.

Figures 8, 9, and 10

A modified form of the invention includes a third pressure device 93, in the form of a two-way cylinder 94 and piston 95, connected between the tractor and trailer in place of the lockable members 85 and 86, the piston including a ball and socket joint 96 for connection to the trailer support structure 53 and the cylinder having a bracket connected to the support block 66 on the draft tongue 58, as shown in Figure 8. This device is expansible or contractible by means of a fluid control system including a pump 74a, similar to the pump 74, and an additional two-way valve 97 and fluid inlets 98 and 99, as shown in Figure 10. The valve 97 may be controlled by a lever 100 to govern fluid inlet to the cylinder 94 at either end, the fluid from the other end of the cylinder returning to the pump through the valve 97 and a return line 101. It will be understood that the fluid system may be otherwise the same as that previously described. The exponent a has been added to reference characters designating parts of the system that are similar to those shown in Figures 1 to 7.

It will be seen that the device 93 may be operated either individually or in conjunction with the devices 60 and 61 to raise the front end of the trailer. Further, the device 93 is lockable by means of fluid control to maintain the raised position of the trailer. The device 93, like the devices 60 and 61, has contractible effort between the upper front part of the trailer and the lower part of the tractor, through the tongue 58, to raise the rear wheels of the tractor. This position of the tractor is advantageous from the standpoint of shifting the rear end of the tractor, for example, to locate a better footing for the traction wheels 35. The device 93, as aforesaid, may also be locked to maintain the raised position of the tractor. Similarly, if the locking means 84 of Figure 5 is used, this means may lock the tractor in raised position.

Figures 11 and 12

In the case of the structure shown in Figures 1 to 4, it has been stated that the power or pressure devices 60 and 61 are connected to members 70 which are rigidly carried by the trailer front supporting structure 53. Figures 11 and 12 show a modified form of this structure in which means are provided for permitting a pivoting of a cross-member 102 to which the piston rods 68 and 69 of the devices 60 and 61 are connected, the cross-member having ball-shaped connecting elements 103 at each end thereof. This pivoting is desirable for allowing the entire pressure device structure to have free lateral swinging when the vehicles are operated under normal operating conditions. The cross-member 102 is pivoted on a support 104 forming a bearing on a vertical axis, preferably coaxial with the vertical pivot axis of the fifth wheel structure 50. Thus, as the draft tongue 58 is swung laterally, carrying with it the power devices 60 and 61, there is free movement of the structure as a unit and no relative movement between each of the pistons 64 or 65 and the cylinders 62 or 63. Broken lines in Figure 11 indicate how the cross-member 102 may swing. When it becomes necessary to operate the devices 60 and 61, the cross-member 102 may be locked rigid with the trailer. For this purpose, the support 53 carries a pair of vertically reciprocable, spring-pressed plungers 105 which are engageable, upon movement upwardly, with vertical bores 106 in the cross-member 102. A transverse rock-shaft 107, journaled in bearings 108 on the support 53, carries a pair of cams 109 respectively engageable with the plungers. A lever 110 is carried at one end of the rock-shaft and has connected thereto a pull cable or the like, as at 111, which may be operated from the tractor in any suitable manner to rock the rock-shaft 107. It will be understood, of course, that any form of locking means may be readily substituted for the form illustrated herein.

Figure 13:
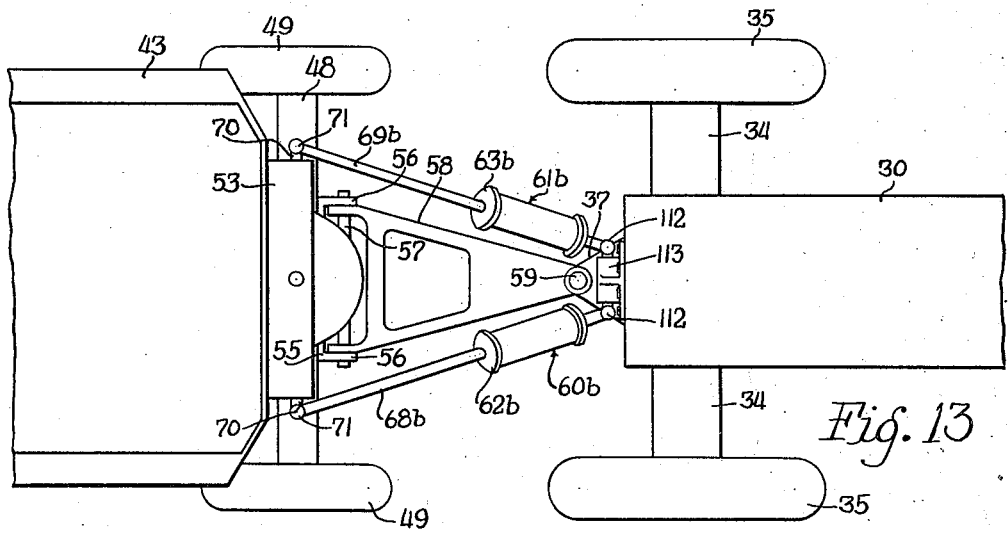
Figure 13 is a plan view of proximate ends of two vehicles, showing a modified form of pressure-device arrangement including a direct connection to both vehicles.

*Figure 13*

The structure here shown is similar to that shown in Figures 1 to 7. However, the power devices are shown as being directly connected to the tractor instead of having the indirect connection through the draft tongue, as shown in Figures 1 to 7. The tractor and trailer may be the same as those shown in previous figures, and the parts thereof bear the same reference numerals. The power devices are indicated at 60b and 61b and are shown as having cylinders 62b and 63b and piston rods 68b and 69b, respectively. The piston rods are connected to the front support 53 of the trailer, and the cylinders are connected, as by ball and socket joints 112, to a bracket 113 rigidly carried by the rear of the tractor body 30. It will be understood, of course, that the devices 60b and 61b may be operated by a fluid system similar to that shown in Figures 6 and 7. Also, the structure just described may utilize the locking means 84, shown in Figure 5, or the third power device 93, as illustrated in Figures 8, 9, and 10. Further, the swingable and lockable cross-member 102 of Figures 11 and 12 may be utilized for the connecting of the devices 60b and 61b to the trailer, just as that lockable structure may be employed with any of the modified structures hereinafter described.

Figure 14:
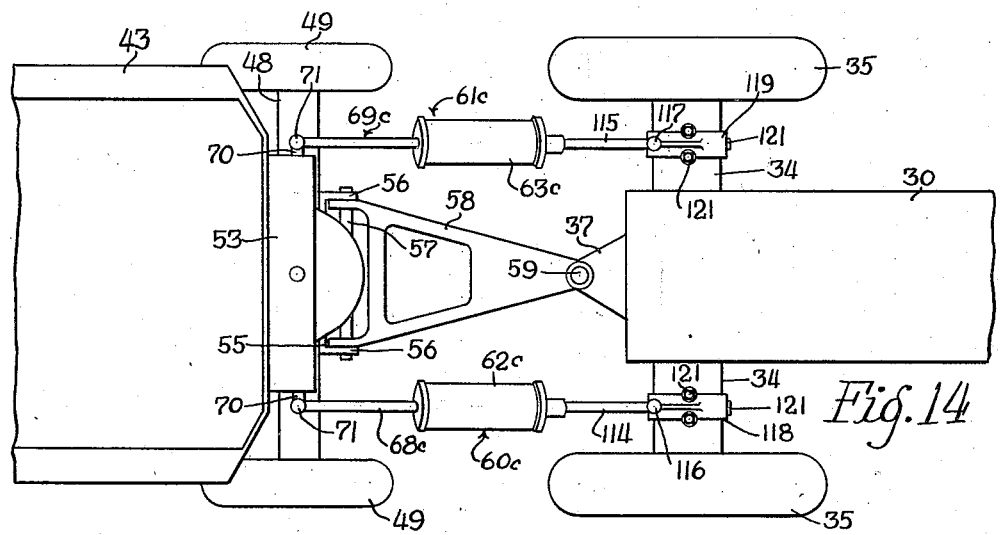
Figure 14 is a similar plan view, showing a second modified arrangement of the pressure devices.
Figure 15:
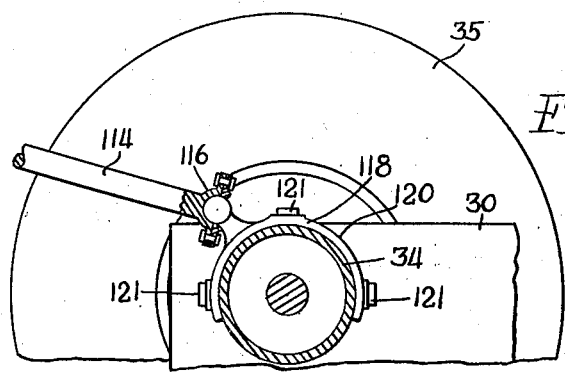
Figure 15 is an enlarged view, partly in section, showing one form of connecting means on one vehicle for connecting a pressure device.

*Figures 14 and 15*

The structure herein illustrated includes a modified form of means for connecting the power devices between the vehicles. The devices are indicated at 60c and 61c, and include cylinders 62c and 63c having piston rods 68c and 69c, respectively. The piston rods are shown as being connected in the previously described manner to the trailer, the structural elements to that extent bearing the reference numerals hereinbefore used. The cylinders 62c and 63c include supporting members 114 and 115, respectively, connected by ball and socket joints 116 and 117 to supporting means, preferably in the form of brackets 118 and 119, respectively, on the tractor body 30. As best shown in Figure 15, each bracket includes a substantially semicircular portion 120 which fits over an axle housing 34, being secured thereto by bolts 121. The fluid system shown in Figures 6 and 7 may be used with the power devices 60c and 61c. Likewise, either of the structures shown in Figures 5 or 8 may be employed here. Further, the connection of the devices 60c and 61c to the trailer may be made with the swingable and lockable structure shown in Figures 11 and 12.

*Figures 16 and 17*

In this structure, the power devices act along lines of force converging from the tractor to the trailer, in this respect substantially the reverse of the arrangement shown in Figures 1 to 4. Also, the connection of the power devices, here designated generally as 60d and 61d, is made directly to the tractor. The connecting means is shown as similar to that illustrated in Figures 14 and 15, although it is obvious that other means may be suitably employed. The devices 60d and 61d include piston rods 68d and 69d. These are connected, as by ball and socket joints 122, to a pivot member 123 pivoted on a vertical bearing pin 124 to the trailer front support 53. The pivot axis is coaxial with the vertical steering axis of the front wheel assembly, and for this reason the swinging structure shown in Figures 11 and 12 need not be used. The operation of the devices 60d and 61d may be effected by the system shown in Figures 6 and 7. Likewise, either the locking means 84 of Figure 5 or the third power device 93 of Figures 8, 9, and 10 may be utilized in conjunction with the power devices 60d and 61d.

*Figures 18, 19, and 20*

The arrangement herein shown differs from those previously described in various respects, and in other respects is similar. As in the case of Figure 16, the power devices, here indicated at 60e and 61e, converge toward the trailer. However, the connection of these devices to the trailer is made indirectly, preferably through a pivot member 125 carried on the tongue 58 through the medium of a flange 126 on the tongue and an additional cross-brace 127 (Figure 19). The member 125 may be exactly that shown at 123 in Figure 17. The connection of the devices to the tractor is shown as being made directly by the means shown in Figure 15.

As will be seen from Figure 20, the particular arrangement of the power devices 60e and 61e is such that not only do the lines of force exerted by expansion of the cylinders converge toward the trailer, but the expanding force is also downwardly on the trailer. However, contraction of the devices 60e and 61e will exert a force having a tendency to raise the front end of the trailer with respect to the tractor. Expansion of the devices will raise the rear end of the tractor with respect to the trailer, which is desirable for many reasons, as explained above.

However, a more suitable means for raising the trailer or tractor with respect to each other may be desirable, and such means has been shown as consisting of a third power device 93e having a cylinder 94e and piston 95e, all of which may be similar to that shown in Figure 8. The piston 95e is preferably connected by a ball and socket joint 96e to the member 54 at the upper portion of the support 53 at the front of the trailer. The locking means 84 of Figure 5 may be substituted for or added to the structure including the device 93e. Similarly, the three-cylinder arrangement here shown may be controlled by means of the fluid system shown in Figures 9 and 10. The pump, inlets, and related parts are designated in Figures 18 and 20 as having the same reference numerals as those parts in Figures 9 and 10, the exponent e being added to the numerals in Figures 18 and 20 for purposes of clarity in subsequent description. Thus, there is provided a three-cylinder system permitting flexible operation of the unit, all cylinders being operable conjointly or individually to obtain the functions and results desired.

*Figure 21*

This arrangement differs from that shown in Figures 18 to 20 in that the power devices, here indicated at 60f and 61f, converge toward the tractor. Further, each device is mounted at one end on the tractor, preferably directly by means of the bracket 113 of Figure 13, and at its other end indirectly to the trailer through the front axle 48, as by means of a bracket 128 and a ball and socket joint 129. Here, as in Figures 18 and 20, the lines of force of expansion of the power devices 60f and 61f are downwardly toward the trailer. Substantially the same functions and results occur here as are possible in the figures previously referred to. For the reasons and purposes stated above, it is preferable to employ a third power device, here designated at 93f, connected between the vehicles, directly to the trailer by a ball and socket connection 96f and indirectly to the tractor through the tongue 58. Certain characteristics of this arrangement will appear in greater detail in the description of the operation of the unit.

Figures 23, 26, and 27

Herein is shown a trailer in which the rear ground support structure is movable to accommodate changes in the direction of travel of the vehicles. The trailer is very similar to that previously shown, including a frame 142, body 143, front ground support structure 144, and rear ground support structure 145. The tractor bears the reference numerals heretofore used. The front ground support structure includes wheels 149 and a transverse axle 148 mounted on a swivel or fifth wheel structure 150. A draft tongue 158 connects the trailer to the hitch member 37 of the tractor. Power devices 160 and 161 are connected between the tractor and trailer in a manner similar to the devices 60 and 61 in Figures 1 to 4, reference being had to those figures for details of the parts. Also shown in Figure 23 is a locking means 184, this likewise being similar to corresponding structure in Figures 1 to 4. Other substitutions of parts may obviously be made between the structure here shown and those in the several figures described previously.

The rear end of the trailer frame 142 carries a pair of transversely spaced journal brackets 200, each of which journals a vertical spindle 201 of a caster wheel 202. The trailer frame 142 is suitably shaped to permit free castering of the wheels 202 as the trailer rear end swings laterally about the vertical axis of the support formed by the front ground support structure 144 and fifth wheel 150. This swinging of the trailer may be accomplished by actuation of the power devices 160 and 161, it being understood that the fluid system of Figures 6 and 7 may be employed for that purpose. Except for the castering of the wheels 202, the unit shown in Figure 23 functions very much like that shown in Figures 1 to 4, and the alterations suggested above, and others that will suggest themselves to those skilled in the art, may all be made within the scope and spirit of the invention.

As shown in Figures 26 and 27, the caster wheels 202 may be locked against castering with respect to the trailer frame 142. A suitable locking means is illustrated here as including a circular member 203 keyed to the spindle 201 of the wheel assembly and formed with a notch 204. This notch is engageable in straight-ahead position of the wheel 202 by a lever 205 carried by a rock-shaft 206. A link 207 is indicated as means by which the lever 205 may be pulled out of the notch in the circular member 203, preferably by an operator from his position on the tractor. A tension spring 207a serves as means for maintaining the lever 205 in position engaging or ready to engage the notch 204.

Figures 24 and 25

As shown here, the vehicle unit includes a tractor having a body 230, front wheels 232 and rear wheels 235, and a trailer in the form of a semi-trailer having a frame 242, body 243, and rear ground support structure 245. The rear ground support structure may be, and is here shown as, identical to that shown in Figures 23, 26, and 27, and corresponding reference numerals, to which has been added the exponent a, have been used. The locking means shown in Figures 26 and 27 may likewise be utilized.

The forward end of the trailer frame 242 extends ahead of the trailer body 243 and includes part of a pivot or supporting structure 250 which is employed to support the front of the trailer on the rear of the tractor instead of on a separate front ground support, such as front wheels, as in the case of a full-trailer. The supporting structure includes a pivot 251, about which the rear of the trailer may swing laterally with respect to the tractor. The function in this respect is very similar to that of the trailer in Figure 23, wherein broken lines indicate the position of the trailer as swung to one side.

The rear portion of the tractor body includes a pair of transversely spaced supports or brackets 251a to which are respectively connected, preferably by ball and socket joints 252, a pair of power devices 260 and 261. These devices, like the devices 60 and 61 of Figures 1 to 4, include cylinders 262 and 263 and piston rods 268 and 269, respectively, which are pivotally connected, as by ball and socket joints 271, to a support 253 at the front of the trailer body 243. Operation of the devices 260 and 261 may be effected by means of a fluid system such as that shown in Figures 6 and 7. It will be understood that the details of the devices 260 and 261 may be similar to those of the devices 60 and 61.

OPERATION

In the following description of the operation of the several modified units, particular reference will be had to the functional and structural characteristics of the unit of Figures 1 to 4. Important characteristics of modified arrangements will be made clear where thought to be not readily apparent to those versed in the art.

Looking now to Figures 1 to 4, it will be noted that Figure 1 represents the unit in straight-ahead position, whether the vehicles be traveling ahead or backward, the important aspect to consider being that the vehicles are in substantial longitudinal alinement. Figure 2 represents a change in the lateral angular relationship of the vehicles, whether this change occurs about either the vertical pivot 59 between the tractor and tongue 58 or the vertical pivot provided by the swivel or fifth-wheel structure 50. The latter has been shown. This change may have occurred because of misdirection of the trailer during backing, in which case the power devices 60 and 61 may be individually or simultaneously operated to effect other changes in angular relationship, either to aline the vehicles longitudinally or to otherwise increase or decrease the angularity between the vehicles.

The devices 60 and 61 may be expanded together and used to raise the front end of the trailer with respect to the tractor, or may be contracted simultaneously to raise the rear end of the tractor with respect to the trailer. In the first case, as has been previously stated, it is possible to increase the tractionability of the tractor rear wheels 35, and it is also possible to effect easier swinging, under certain conditions, of the vehicles with respect to each other, in which case the unit becomes very similar to that of Figures 24 and 25. Either the locking means 84 of Figure 5 or the third power device 93 of Figure 8 may be used. If the swingable and lockable structure of Figures 11 and 12 is used, this is first locked before actuation of the devices. If the third power device 93 of Figure 8 is used in lieu of the lockable means 84 of Figure 5, then such device may be employed either together with or separately from the devices 60 and 61 for raising one vehicle with respect to the other, this device being also lockable to maintain a selected position.

The operation of the units and arrangements of Figures 13, 14, and 16 is similar to that described above, and any differences in the functioning thereof will readily appear from a comparison thereof with the foregoing remarks.

In the cases of the units of Figures 18, 20, and 21, it will be understood that it is preferable to use the third power device (93e or 93f) for the raising of one vehicle with respect to the other. In all cases where the three-cylinder arrangement is used, the fluid system of Figures 9 and 10 may suitably be employed.

Looking now to Figures 23 and 24, wherein the trailers are provided with castering wheels, it will be noted that the rear of either trailer may, by operation of the power devices 160 and 161 or 260 and 261, be swung laterally with respect to the tractor 130 or 230, respectively. If the lockable caster wheels are employed, the locks are released for maneuvering, and are preferably locked for normal operation.

In all cases, it will be seen that there has been provided, according to the invention, a pair of articulately interconnected vehicles, one of which is maneuverable by its own power to push or pull the other, and that means have been provided for the maneuvering of either vehicle with respect to the other, the other acting as a supporting base or anchor against which means, preferably power-operated as described, may apply force to change the angular relationship between the vehicles. In some cases, the angular relationship is altered only laterally, in other cases, vertically, and in some cases, both laterally and vertically.

It will be readily apparent that various elements and means illustrated and described for the purpose of disclosing the invention will suggest other means to those skilled in the art. Such, for example, are the power devices 60 and 61, which may be mechanically, electrically, pneumatically, etc. controlled, or which may in fact be manually controlled, the term "power devices" not being intended to include only devices actuated by power but rather to designate that the devices, such as 60, 61, or 93, are capable of exerting power or forces. Certain other alterations and modifications may occur to those skilled in the art, and it will be understood that such changes may be made in any or all of the several forms of the invention herein illustrated without departing from the spirit and scope of the invention as defined in the appended claims.

What is claimed is:

1. In combination, a first vehicle, a second vehicle, connecting means between the vehicles through which the first vehicle acts along a line of force to propel and guide the second vehicle over the ground, and means connected between the vehicles for exerting a thrust force between the vehicles separate from the aforesaid propelling and guiding force and along a line of force offset laterally and vertically from the propelling and guiding force.

2. In combination, a first vehicle, a second vehicle, connecting means between the vehicles through which movement of one vehicle over the ground exerts a force moving the other vehicle for travel of said vehicles together, ground-engaging means supporting the first vehicle, ground-engaging means supporting the second vehicle and movable with respect thereto to accommodate change in the direction of travel of said second vehicle, and force-exerting means connected and acting between the vehicles for moving the second vehicle and its ground support laterally relative to each other.

3. In combination, a draft vehicle, a trailing vehicle, ground-engaging means supporting the front end of the trailing vehicle, second ground-engaging means supporting the rear end of the trailing vehicle, means connecting the draft vehicle and trailing vehicle for travel together, means mounting one of the ground-engaging means on the trailing vehicle for lateral swinging of the ground support with respect to the trailing vehicle as the direction of travel of the draft vehicle and trailing vehicle is varied laterally, and means connected between the draft vehicle and trailing vehicle for swinging the trailing vehicle and its movable ground-engaging means relatively laterally.

4. In combination, a draft vehicle, a trailing vehicle, ground-engaging means supporting the front end of the trailing vehicle, second ground-engaging means supporting the rear end of the trailing vehicle, means connecting the draft vehicle and trailing vehicle for travel together, means mounting one of the ground-engaging means on the trailing vehicle for lateral swinging of the ground support with respect to the trailing vehicle as the direction of travel of the draft vehicle and trailing vehicle is varied laterally, means connected between the vehicles for transfering part of the weight of one vehicle to the other vehicle, and means connected between the draft vehicle and trailing vehicle for moving the trailing vehicle and its movable ground-engaging means relatively laterally.

5. In combination, a first vehicle, a second vehicle, connecting means between the vehicles through which the first vehicle acts along a line of force to propel and guide the second vehicle over the ground, means connected between the vehicles for transferring part of the weight of one vehicle to the other vehicle, and means connected between the vehicles for exerting a force between the vehicles separate from the aforesaid propelling and guiding force and along a line of force offset laterally from the propelling and guiding force.

6. In combination, first and second vehicles arranged in end-to-end relation with their proximate ends adjacent, means articulately interconnecting the vehicles at their proximate ends for relative movement laterally and vertically and for travel of the vehicles together, means connected between the vehicles for raising the proximate end of one vehicle with respect to the other, and means connected between the vehicles for shifting the raised vehicle laterally with respect to the other vehicle.

7. In combination, first and second vehicles, front and rear ground-engaging means carrying the first vehicle, pivot means mounting one of said ground-engaging means on the first vehicle on a substantially vertical axis for swinging movement relative thereto to accommodate changes in the direction of travel of said vehicle, means interconnecting said vehicles for travel together, means connecting said interconnecting means and the swingable ground-engaging means for guiding the latter as the vehicles change direction, and means connecting the vehicles for pivoting the first vehicle and its swingable ground-engaging means relatively laterally in addition to guiding forces of the aforesaid interconnecting means.

8. In combination, first and second vehicles, front and rear ground-engaging means carrying the first vehicle, pivot means mounting the front ground-engaging means on the first vehicle on a substantially vertical axis for swinging movement relative thereto to accommodate changes in the direction of travel of said vehicle, means interconnecting said vehicles for travel together, means connecting said interconnecting means and the front ground-engaging means for guiding the latter as the vehicles change direction, means connected between the vehicles for raising the front end of the first vehicle with respect to the second vehicle to relieve the front ground-engaging means of at least part of the weight of said first vehicle, and means connecting the vehicles for pivoting the raised first vehicle and its swingable ground-engaging means relatively laterally in addition to guiding forces of the aforesaid interconnecting means.

9. In combination, first and second vehicles arranged in end-to-end relationship with their proximate ends adjacent, means articulately interconnecting said vehicles for travel together, a pair of expansible force-exerting means between the vehicles, means connecting each force-exerting means to the first vehicle, means connecting each force-exerting means to the second vehicle at laterally spaced points on said second vehicle, whereby the first vehicle serves as an anchor from which forces exerted by expansion of the force-exerting means may act to push the second vehicle laterally with respect to the first vehicle, and means connected to each force-exerting means for expanding each means individually or in conjunction with the other means to exert forces between the vehicles for moving one vehicle with respect to the other.

10. In combination, first and second vehicles arranged in end-to-end relationship with their proximate ends adjacent, means articulately interconnecting said vehicles for travel together, first and second expansible-and-contractible means between the vehicles, means connecting each expansible-and-contractible means to the first vehicle, and means connecting each expansible-and-contractible means to the second vehicle at spaced points on said second vehicle, each of said expansible-and-contractible means being operable independently or in conjunction with the other means to exert varying forces between the vehicles for moving one vehicle with respect to the other.

11. In combination, first and second vehicles, means interconnecting said vehicles so that one vehicle may exert force on the other vehicle for travel of the vehicles together, said means permitting limited relative movement of said vehicles in a plane transverse of the line of travel as the vehicles change direction, and means disposed between said vehicles for moving said vehicles relatively in addition to movement of the vehicles because of the aforesaid interconnecting means, said means comprising a first expansible-and-contractible means connected between the vehicles to exert expanding and contracting forces between the vehicles along a line of force spaced from the line of force exerted through the interconnecting means, and a second expansible-and-contractible means connected between the vehicles for exerting expanding and contracting forces along a line of force spaced from the line of force exerted by the first expansible-and-contractible means.

12. In combination, first and second vehicles arranged in end-to-end relation with their proximate ends adjacent, ground-engaging means carrying the proximate end of the first vehicle, means mounting the ground-engaging means on said vehicle for swinging movement about a substantially vertical pivot axis, means articulately interconnecting said vehicles for travel together, force-exerting means between the vehicles for exerting a force from one vehicle against the other along a line spaced laterally from the line of force exerted through the aforesaid interconnecting means by travel of the vehicles, means connecting said force-exerting means to the second vehicle, and means connecting said force-exerting means to the first vehicle at a point substantially in vertical alinement with the aforesaid pivot axis of the ground-engaging means.

13. In combination, first and second vehicles, means articulately interconnecting the vehicles for travel together, a connecting member mounted on the first vehicle for movement with respect thereto generally about a vertical axis, first and second force-exerting means disposed between the vehicles, means connecting each force-exerting means to the second vehicle, means connecting one force-exerting means to the aforesaid connecting member at a portion of said member spaced laterally from one side of the aforesaid mounting axis, means connecting the other force-exerting means to the connecting member at a portion of said member spaced laterally from the other side of said mounting axis, and means for operating said force-exerting means for exerting force between said vehicles along a line spaced from the line of force exerted through the aforesaid interconnecting means by travel of the vehicles.

14. In combination, first and second vehicles, means articulately interconnecting the vehicles for travel together, a connecting member mounted on the first vehicle for movement with respect thereto generally about a vertical axis, first and second force-exerting means disposed between the vehicles, means connecting each force-exerting means to the second vehicle, means connecting one force-exerting means to the aforesaid connecting member at a portion of said member spaced laterally from one side of the aforesaid mounting axis, means connecting the other force-exerting means to the connecting member at a portion of said member spaced laterally from the other side of said mounting axis, means for operating said force-exerting means for exerting force between said vehicles along a line spaced from the line of force exerted through the aforesaid interconnecting means by travel of the vehicles, and releasable means between the connecting member and the first vehicle for restraining said member against movement relative to said vehicle.

15. In combination, first and second vehicles, mean articulately interconnecting the vehicles for travel together, a connecting member mounted on the first vehicle for movement with respect thereto generally about a vertical axis, first and second force-exerting means disposed between the vehicles, means connecting each force-exerting means to the second vehicle, means connecting one force-exerting means to the aforesaid connecting member at a portion of said member spaced laterally from one side of the aforesaid mounting axis, means connecting the other force-exerting means to the connecting member at a portion of said member spaced laterally from the other side of said mounting axis, ground-engaging means carrying the first vehicle, means mounting said ground-engaging means for movement with respect to said vehicle about a substantially vertical axis in substantial alinement with the aforesaid axis, and means for operating said force-exerting means for exerting force between said vehicles along a line spaced from the line of force exerted through the aforesaid interconnecting means by travel of the vehicles.

16. In combination, first and second vehicles, means articulately interconnecting the vehicles for travel together, a connecting member mounted on the first vehicle for movement with respect thereto generally about a vertical axis, first and second force-exerting means disposed between the vehicles, means connecting each force-exerting means to the second vehicle, means connecting one force-exerting means to the aforesaid connecting member at a portion of said member spaced laterally from one side of the aforesaid mounting axis, means connecting the other force-exerting means to the connecting member at a portion of said member spaced laterally from the other side of said mounting axis, ground-engaging means carrying the first vehicle, means mounting said ground-engaging means for movement with respect to said vehicle about a substantially vertical axis in substantial alinement with the aforesaid axis, means for operating said force-exerting means for exerting force between said vehicles along a line spaced from the line of force exerted through the aforesaid interconnecting means by travel of the vehicles, and releasable locking means between the connecting member and the first vehicle for confining said member against movement relative to said vehicle.

17. In combination, first and second vehicles, means articulately interconnecting the vehicles for travel together, a connecting member mounted on the first vehicle for movement with respect thereto, first and second force-exerting means disposed between the vehicles, means connecting each force-exerting means to the second vehicle, means connecting one force-exerting means to the aforesaid connecting member, means connecting the other force-exerting means to the connecting member, means for operating said force-exerting means for exerting force between the second vehicle and the aforesaid connecting member along a line spaced from the line of force exerted through the aforesaid interconnecting means by travel of the vehicles, and releasable means between the connecting member and the first vehicle for restraining said member against movement relative to said vehicle.

18. In combination, first and second vehicles, a laterally swingable ground support on the first vehicle means interconnecting said vehicles through which one vehicle may move the other, means mounting said interconnecting means on the first vehicle for movement laterally with respect thereto as the direction of travel of the vehicles is changed, and means connected between the interconnecting means and the first vehicle independently of the ground support for moving said vehicle and the interconnecting means laterally with respect to each other.

19. In combination, first and second vehicles, a laterally swingable ground support on the first vehicle means interconnecting said vehicles through which one vehicle may move the other for travel together, means mounting the interconnecting means at one end on the ground support for swinging the ground support laterally with respect to the first vehicle, means mounting the interconnecting means at its other end on the second vehicle for movement laterally with respect thereto, and means connecting the interconnecting means and one of the vehicles for moving the interconnecting means together with the ground support laterally with respect to the first vehicle.

20. In combination, first and second vehicles, draft means between the vehicles, means effecting a connection between the draft means and the first vehicle for relative movement therebetween vertically and laterally, means effecting a like connection between the draft means and the second vehicle, means connected between the vehicles for raising one vehicle with respect to the other, means for supporting the raised vehicle on the other vehicle, and means connected between the draft means and the raised vehicle for moving said vehicle and the draft means laterally with respect to each other.

21. In combination, first and second vehicles, draft means articulately interconnecting the vehicles for travel together and for relative movement laterally and vertically, means connected between the vehicles for moving one vehicle vertically with respect to the other, and means connected between the vehicles for moving one vehicle laterally with respect to the other.

22. In combination, first and second vehicles, draft means articulately interconnecting the vehicles for travel together and for relative movement laterally and vertically, means connected between the vehicles for moving one vehicle vertically with respect to the other, and means connected between the draft means and one vehicle for moving one vehicle laterally with respect to the other.

23. In combination, first and second vehicles, draft means articulately interconnecting the vehicles for travel together and for relative movement laterally and vertically, means connected between one vehicle and the draft means for moving one vehicle vertically with respect to the other, and means connected between the vehicles for moving one vehicle laterally with respect to the other.

24. In combination, first and second vehicles, draft means articulately interconnecting the vehicles for travel together and for relative movement laterally and vertically, means connected between one vehicle and the draft means for moving one vehicle vertically with respect to the other, and means connected between one vehicle and the draft means for moving one vehicle laterally with respect to the other.

25. In combination, first and second vehicles, ground-engaging means for the first vehicle, means mounting the ground-engaging means on the first vehicle for movement with respect thereto generally about a vertical axis, draft means between the vehicles, means connecting the draft means to the second vehicle, means connecting the draft means to the ground-engaging means for movement of the ground-engaging means and the draft means together about the aforesaid vertical axis, and means connecting the second vehicle and the ground-engaging means for moving the first vehicle and the ground-engaging means relatively about the aforesaid axis.

26. In combination, first and second vehicles arranged normally in longitudinal end-to-end relationship with their proximate ends adjacent, means articulately interconnecting the vehicles together for movement of one by the other, and means between the vehicles for exerting forces from one vehicle to the other along lines of force at opposite sides of the line of force exerted by one vehicle on the other through the aforesaid interconnecting means, said means comprising a pair of force-exerting devices, means connecting each force-exerting device at one end to the first vehicle, and means connecting the force-exerting devices at their other ends to the second vehicle at laterally spaced points thereon.

27. In combination, first and second vehicles arranged normally in longitudinal end-to-end relationship with their proximate ends adjacent, means articulately interconnecting the vehicles for movement of one by the other, and means between the vehicles for exerting forces from one vehicle to the other along lines of force at opposite sides of the line of force exerted by one vehicle on the other through the aforesaid interconnecting means, said means comprising a pair of force-exerting devices converging from spaced points on the first vehicle to a point on the second vehicle, means connecting the devices to the first vehicle, and means connecting the devices to the second vehicle.

28. In combination, first and second vehicles arranged normally in longitudinal end-to-end relationship with their proximate ends adjacent, means articulately interconnecting the vehicles for movement of one by the other, and means between the vehicles for exerting forces from one vehicle to the other along lines of force at opposite sides of the line of force exerted by one vehicle on the other through the aforesaid interconnecting means, said means comprising a pair of force-exerting devices converging from spaced points on the first vehicle to a point on the interconnecting means, means connecting the devices to the first vehicle, and means connecting the devices to the interconnecting means.

29. In combination, first and second vehicles arranged normally in longitudinal end-to-end relationship with their proximate ends adjacent, means articulately interconnecting the vehicles together for movement of one by the other, and means between the vehicles for moving one vehicle vertically with respect to the other and including a force-exerting device extending generally centrally between the proximate ends of the vehicles, means connecting the force-exerting device at one end to a central point on the first vehicle, means connecting the force-exerting device at a central point to the second vehicle, a pair of force-exerting devices converging between the vehicles from the first vehicle toward the second vehicle, means connecting each of said devices at one end to the first vehicle at a central point thereon, and means connecting said devices at their other ends to the second vehicle at points thereon laterally at opposite sides of the aforesaid central connection of the first force-exerting device.

30. In combination, first and second vehicles, means connecting the first vehicle to the second vehicle for travel therewith and for limited movement laterally with respect thereto, ground-engaging means supporting said first vehicle, means mounting said ground-engaging means on the first vehicle for laterally swingable movement, and means connected between the vehicles for shifting the first vehicle laterally with respect to the second vehicle.

31. In combination, first and second vehicles arranged in end-to-end relationship with their proximate ends adjacent, means connecting the proximate ends of the vehicles for travel of the vehicles together and including a substantially vertical pivot providing for relative lateral swinging of the vehicles, laterally swingable ground-engaging means supporting the remote end of the first vehicle, and means connected between the vehicles for swinging the first vehicle laterally with respect to the second vehicle about the aforesaid pivot, the laterally swingable ground-engaging means carrying the remote end of the first vehicle in an arcuate path about said pivot as a center.

32. In combination, first and second vehicles, means connecting the vehicles for travel together and including a connection permitting limited lateral movement of one vehicle with respect to the other, means supporting one end of the first vehicle and providing a pivot about which the other end of the said vehicle may swing laterally, laterally swingable ground-engaging means supporting said second-mentioned end of said first vehicle and adapted to carry said end of the vehicle during lateral swinging, and means connected between the vehicles for swinging the second-mentioned end of the first vehicle laterally about the aforesaid pivot.

33. In combination, a first vehicle, a second vehicle including a longitudinal body, means connecting the vehicles for travel together and permitting limited movement of the second vehicle laterally with respect to the first vehicle, means supporting one end of the second vehicle and providing a support with respect to which the other end of said vehicle may swing laterally, ground-engaging means supporting the second-mentioned end of said second vehicle, means mounting said ground-engaging means on said vehicle for movement from a position supporting the vehicle for movement longitudinally to a position supporting the second-mentioned end of said vehicle for lateral swinging, and means connected between the vehicles for swinging the second-mentioned end of the second vehicle laterally with respect to the aforesaid supporting means.

34. In combination, a first vehicle, a second vehicle including a longitudinal body, supporting structure at one end of the body of the second vehicle, means connecting said structure to said end of the second vehicle and providing a support with respect to which the other end of said second vehicle may swing laterally, means connecting said structure to the first vehicle, ground-engaging means at the second-mentioned end of the second vehicle, means connecting said ground-engaging means and said vehicle for movement of said means with respect to the vehicle as said vehicle swings laterally, and means connected between the second vehicle and the aforesaid support for shifting the second-mentioned end of said second vehicle laterally with respect to the support.

35. In combination, a draft vehicle, a trailing vehicle, ground-engaging means carrying the rear of the trailing vehicle, means connecting said ground-engaging means for lateral swinging with respect to the trailing vehicle, second ground-engaging means at the front of the trailing vehicle, means mounting said second ground-engaging means for swinging movement with respect to the trailing vehicle about a substantially vertical axis, draft means connecting the draft and trailing vehicles and operative to swing the front ground-engaging means, and means connected between the vehicles for swinging the rear end of the trailing vehicle laterally about the axis of the front ground-engaging means.

36. In combination, a draft vehicle, a trailing vehicle, a rear ground support for the trailing vehicle, means connecting said ground support to the trailing vehicle for lateral swinging, front structure for the trailing vehicle including a front ground support and draft means connected to the draft vehicle, means mounting said front structure and trailing vehicle for relative movement about a substantially vertical axis, and means connected between the front structure and the trailing vehicle for swinging the trailing vehicle laterally with respect to said structure about the aforesaid axis.

37. In combination, a draft vehicle, a trailing vehicle, a rear ground support for the trailing vehicle, means connecting said ground support to the trailing vehicle for lateral swinging, front structure for the trailing vehicle including a front ground support and draft means connected to the draft vehicle, means mounting said front structure and trailing vehicle for relative movement about a substantially vertical axis, and means connected between the front structure and one of the vehicles for swinging the trailing vehicle and front structure laterally with respect to each other about the aforesaid axis.

38. In combination, a draft vehicle, a trailing vehicle, ground-engaging means carrying the rear of the trailing vehicle, ground-engaging means carrying the front end of the trailing vehicle, means mounting the front ground-engaging means on the trailing vehicle for pivoting about a substantially vertical axis with respect to said vehicle to accommodate changes in the direction of travel of said trailing vehicle, means connecting the draft vehicle and trailing vehicle for travel together and swingable laterally to pivot the trailing vehicle and its front ground-engaging means relatively as the draft vehicle changes direction, and means connected between the vehicles to pivot the trailing vehicle and its front ground-engaging means relatively separate from changes in direction of travel of the draft vehicle.

39. In combination, a first vehicle, a second vehicle, connecting means between the vehicles through which the first vehicle acts along a line of force to propel and guide the second vehicle over the ground, expansible force-exerting means between the vehicles, means connecting the force-exerting means to the first vehicle, and means connecting the force-exerting means to the second vehicle, whereby the first vehicle serves as an anchor from which forces exerted by expansion of the force-exerting means may act to push the second vehicle laterally with respect to the first vehicle.

LOVEL R. SIMMONS.